United States Patent
Lemer et al.

(10) Patent No.: US 10,663,557 B2
(45) Date of Patent: May 26, 2020

(54) METHOD AND SYSTEM OF GEOLOCATION BY DIRECT CALCULATION OF MOVEMENT ELEMENTS

(71) Applicant: THALES, Courbevoie (FR)

(72) Inventors: Alain Lemer, Gennevilliers (FR); Frédérique Ywanne, Gennevilliers (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/322,806

(22) PCT Filed: Aug. 1, 2017

(86) PCT No.: PCT/EP2017/069482
§ 371 (c)(1),
(2) Date: Feb. 1, 2019

(87) PCT Pub. No.: WO2018/024750
PCT Pub. Date: Feb. 8, 2018

(65) Prior Publication Data
US 2019/0170852 A1 Jun. 6, 2019

(30) Foreign Application Priority Data
Aug. 2, 2016 (FR) ...................... 16 01190

(51) Int. Cl.
*G01S 5/00* (2006.01)
*G01S 5/02* (2010.01)
*G06F 17/18* (2006.01)

(52) U.S. Cl.
CPC .......... *G01S 5/0289* (2013.01); *G01S 5/0252* (2013.01); *G06F 17/18* (2013.01)

(58) Field of Classification Search
CPC ....... G01S 5/0289; G01S 5/0252; G06F 17/18
See application file for complete search history.

(56) References Cited

U.S. PATENT DOCUMENTS

| | | | |
|---|---|---|---|
| 2015/0278410 A1* | 10/2015 | Kumar | G01R 19/2513 703/2 |
| 2016/0283756 A1* | 9/2016 | Lenchner | G01S 5/0252 |
| 2017/0371841 A1* | 12/2017 | Hayden | G06F 17/18 |

FOREIGN PATENT DOCUMENTS

| EP | 1 617 601 A2 | 1/2006 |
|---|---|---|
| WO | 03/107595 A1 | 12/2003 |

OTHER PUBLICATIONS

Wang, et al., "Anchor-Based Three-Dimensional Localization Using Range Measurement", 2012 8th International Conference on Wireless Communications, Networking and Mobile Computing, Sep. 21-23, 2012.
Wendeberg, et al., "Anchor-free TDOA Self-Localization", Journal of Location Based Services, vol. 7, Issue 2, 2013.
(Continued)

*Primary Examiner* — Pakee Fang
(74) *Attorney, Agent, or Firm* — Baker & Hostetler LLP (57) ABSTRACT

A method that exploits all of the uncertainties of the ranging measurements and the positions of the anchors is provided, so as to modify the position of the anchors and arrive at a minimal squared error in the ranging measurements. The result of the implementation of the method allows the position of one or more objects in a given space to be obtained precisely.

11 Claims, 4 Drawing Sheets

(56) References Cited

OTHER PUBLICATIONS

Wu, et al., "Effective error control of iterative localization for wireless sensor networks", AEU—International Journal of Electronics and Communications, vol. 67, Issue 5, pp. 397-405, May 1, 2013.

Hernandez, et al., "Maximum likelihood position estimation in ad-hoc networks using a dead reckoning approach", IEEE Transactions on Wireless Communications, vol. 7, Issue: 5, pp. 1572-1584, May 1, 2008.

\* cited by examiner

METHOD AND SYSTEM OF GEOLOCATION BY DIRECT CALCULATION OF MOVEMENT ELEMENTS

CROSS-REFERENCE TO RELATED APPLICATIONS

This application is a National Stage of International patent application PCT/EP2017/069482, filed on Aug. 1, 2017, which claims priority to foreign French patent application No. FR 1601190, filed on Aug. 2, 2016, the disclosures of which are incorporated by reference in their entirety.

FIELD OF THE INVENTION

The invention relates to a method and a system for geolocation of one or more objects using distance measurements obtained by an inter-node distance measurement function known under the term "ranging" and imprecise anchor positions, by direct calculation of displacement elements. The method thus makes it possible to determine the position of an object on a map, on a plane, in a given reference frame with the aid of its geographical coordinates, latitude/longitude or other coordinates.

BACKGROUND

Determining the position of an object with known distances to other objects having known positions is a conventional subject in the field of localization. In general, use is made of detection stations whose position is perfectly known, or "anchors". In this case, the uncertainty in the result of the position lies mainly in the precision of the distance measurements, called "ranging" further below.

Another possible approach consists in determining the relative positioning of the nodes of a network of stations, on the sole basis of information of relative distances between all or some of these nodes. Precise knowledge of a limited amount of a priori position information regarding certain nodes then makes it possible to determine the absolute position of all of the nodes of the network. However, several obstacles have to be overcome, for example:

- All of the distance measurements between the nodes are not necessarily accessible, due to the range of the ranging modules,
- The distance measurements are necessarily affected by errors, making geometric resolution potentially overdetermined,
- The information necessary for absolute positioning may be distributed over the coordinates of a plurality of nodes, Finally, the information necessary for absolute positioning may also be affected by errors, which are potentially larger than those associated with the ranging.

This last point is particularly important in practice, notably in collaborative navigation. Specifically, the absolute positioning information of certain nodes is often obtained by receivers of the satellite positioning system known under the abbreviation commercial GNSS (Global Navigation Satellite System), whose positioning error may, in difficult reception conditions, greatly exceed the inter-node distance measurement (ranging) errors. Ignoring this situation may then lead to positioning errors for free nodes, or even to the rejection of ranging measurements that are valid but incompatible with the distances calculated on the basis of the absolute positions, which are assumed to be error-free.

One of the technical problems posed is to find an effective solution for calculating the positions of nodes, so that a metric of the deviations between the ranging measurements and the inter-node distances of the solution is minimal, and while taking into account the uncertainty associated with the ranging errors and with the absolute positioning errors.

The prior art mainly describes two approaches to deal with this problem.

A first approach consists in reconstructing a relative geometry of the nodes of a network using ranging information and, possibly, inter-node angular information, for example by goniometry within a node. These methods are generally grouped together under the term "anchor-free localization". In this approach, which uses only ranging measurements, all of the positions of the nodes are free, a priori, and the methods seek to adjust them such that the mean squared error between the calculated inter-node distances and the ranging measurements is minimal. A great number of algorithms have been proposed, from the simple mass-spring algorithm to more complex optimization techniques, for example, the least-squares solution by Newton-Raphson, particle filtering, etc. Most of the variants of this approach seek to avoid convergence to a local minimum, without however guaranteeing this.

A second approach aims to reconstruct the absolute position of the nodes of the network using ranging information through knowledge a priori of the position of some of said nodes, these being called "anchors". This also involves minimizing the mean squared deviation between the distance between the positions of the nodes and the ranging measurements, certain positions being a priori fixed and known. The problem is then a problem of minimizing a function of the coordinates of free nodes, for example via a steepest descent algorithm. The article "Anchor-Based Three-Dimensional Localization Using Range Measurements", Wang, Yue et al., illustrates this approach, which does not however guarantee that a global optimum is achieved. Some more theoretical works propose global optimization methods.

A third approach uses external sources or anchors having unknown positions. The problem is known under the term "self-calibration", in which it is sought to jointly locate sources and the sensors that detect them. Time differences of arrival or TDOA are used, this giving less rich information than a direct ranging measurement, similar to a time of arrival or TOA, and not utilizing information a priori on the positions of the sources. The article "Calibration-Free TDOA Self-Localization, Wendeberg Johannes et al., in Journal of Location Based Services, May 2013", illustrates one possible implementation of this approach through a plurality of conventional algorithms (mass-spring, gradient descent, Gauss Newton, etc.) or more specific algorithms (Cone alignment algorithm), these algorithms being known to those skilled in the art.

One of the drawbacks of the prior art is that it assumes:

- Either that all of the positions of the sensors are free, delivering only a geometry of all of the nodes that is potentially precise, but relative coordinates of the nodes with respect to one another,
- Or that the determination of the absolute position of the nodes is based on external knowledge of the position of some of said nodes whose accuracy is assumed to be perfect.

A priori, the prior art does not deal with joint integration of the uncertainty as to the position of the anchors and the possible questioning of these positions.

Figure 1:
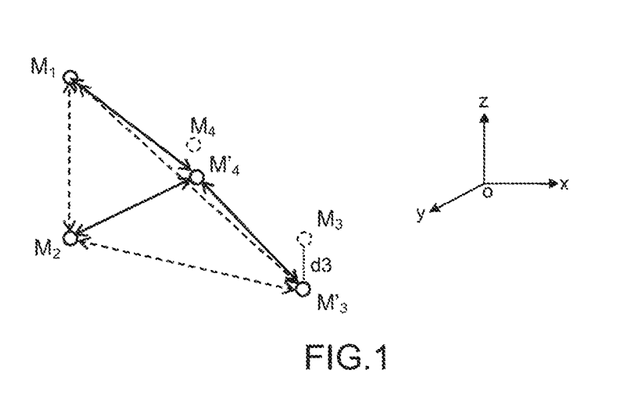
FIG. 1 shows an illustration of the problems of the prior art.

FIG. 1 illustrates the problems that are not solved by the prior art. In this example, the coordinates of the anchors associated with the nodes $M_1$ and $M_2$ are assumed to be accessible ideally, that is to say without error, for example by virtue of topographical surveys, whereas the coordinates of the anchor $M_3$ are in practice affected by an error d3, for example measured by a GNSS system, positioning the anchor $M_3$ at the point $M'_3$. Another assumption of this illustration is that the ranging precision is perfect, in practice much worse than d3. The ranging measurements are represented by arrows in FIG. 1. The prior art techniques incorrectly estimate the position of the free node at $M'_4$, the actual position of the free node $M_4$ by distributing the ranging errors associated with this node, which results in a significant residual mean squared error minimum. Furthermore, the position of the node $M_3$ is not questioned, and remains erroneous.

SUMMARY OF THE INVENTION

The method according to the invention will notably exploit all of the uncertainties of the ranging measurements and the positions of the anchors, thereby making it possible notably to modify the position of the anchors, in order to arrive at a minimal squared error in the ranging measurements. The result of the implementation of the method according to the invention will allow the position of an object in a given space to be obtained precisely.

The invention relates to a method for determining the position of one or more objects able to move in a network, each object being provided with an ability to measure distance to the other nodes of the network, at least some of the coordinates of an object being known, characterized in that it comprises at least the following steps:

Generating a set of points Ai or anchors, the coordinates of the anchors and the uncertainty as to the coordinates describing information on the position of the objects and the uncertainty as to this information, Generating a set containing the estimated positions of the objects and defining an initial position of the points, Defining a set of distance measurements between at least two objects Mi, Mj, with associated uncertainties, and executing the following steps:

Step 1, for each object $M_i$, calculate a displacement $$\vec{\delta}_{\to i} = \sum_{j \in R_i} \vec{\delta}_{j \to i}$$

corresponding to the vector sum of the ranging or measurement displacements over the set of available ranging measurements toward the object $M_i$ and induced on this object $M_i$ by all of the other objects having a ranging measurement from said object $M_i$, due to the relative ranging measurement $r_{ij}$ between $M_i$ and $M_j$ and its uncertainty $\sigma_{rij}$, with $R_i = \{r_{ij}\}$ all of the available ranging measurements toward $M_i$, and $$\vec{\delta}_{\to i} = \sum_{j \in R_i} \vec{\delta}_{j \to i}$$

where $$\vec{\delta}_{j \to i} = \varphi(\Delta_{ij}, \sigma_{rij}) \frac{\vec{M_j M_i}}{\|\vec{M_j M_i}\|}$$

with $\Delta_{ij}$ the coordinates of $M_j M_i$, q is a given displacement function, Step 2, for each object $M_i$, having an anchoring coordinate in a virtual anchor associated with a fixed anchor $A_i$, calculate a return displacement value $\vec{a}_{\to i}$ to this anchor with $\vec{a}_{\to i} = \Psi(\vec{A_i M_i} + \vec{\delta}_{\to i}, \vec{\sigma}_{Ai})$, $\Psi$ a displacement function, Step 3, apply, to each object $M_i$, a displacement equal to the sum of the ranging displacement $\vec{\delta}_{\to i}$ and the anchoring correction $\vec{a}_{\to i}$ that were calculated previously, $\vec{OM_i}(l+1) = \vec{OM_i}(l) + \vec{\delta}_{\to i} + \vec{a}_{\to i}$, Step 4, calculate the square of the error term $\Delta_{tot}^2$, where $$\Delta_i^2 = \sum_{j \neq i} \Delta_{ij}^2 \text{ with } \Delta_{ij} = r_{ij} - d(M_i, M_j),$$

$\Delta$ is an error term between an estimation of the distance d(Mi, Mj) after displacement of the object in step 3 and the distance measurement r provided by ranging devices on all of the nodes, compare this quantity with a stopping criterion defined beforehand by an operator, if $\Delta_{tot}^2 \leq \Delta_{fin}^2$, or else $\max(|\Delta|_{ij})<$Maxdeviation, if this test is met, go to step 6, If not, Step 5, test whether a maximum number of iterations has been reached, If $1 < l_{max}$ then iterate l=l+1 and go to step 1, if not go to step 6, Step 6, end of the iterations, define the position of the objects corresponding to the best estimation of the actual position of the objects obtained for each object.

The coordinates may be obtained by an external geolocation means whose precision is known.

An anchor and its uncertainty vector are, for example, defined as follows:

If an external measurement $m_i^k$ is assumed to be known by a geolocation device, such as for example a GNSS sensor or a topographical survey, on the coordinate k of the object $M_i$ with an uncertainty $\sigma_{Ai}^k$, then the $k^{th}$ coordinate of the anchor $A_i$ is equal to $m_i^k$ and the $k^{th}$ coordinate of the uncertainty vector $\vec{\sigma}_{Ai}$ is equal to $\sigma_{Ai}^k$, In the opposite case, the $k^{th}$ coordinate of the anchor $A_i$ is set to an arbitrary value (for example, 0) and the $k^{th}$ coordinate of the uncertainty vector $\vec{\sigma}_{Ai}$ is set to a negative arbitrary value.

It is possible to use a displacement function proportional to an intermediate function defined as follows:

$$f(\varepsilon, \sigma) = \begin{cases} 1 - e^{-\frac{\varepsilon^2}{2\sigma^2}}, & \text{if } \sigma > 0 \text{ (anchored coordinate)} \\ 1, & \text{if } \sigma = 0 \text{ (fixed anchored coordinate)} \\ 0, & \text{if } \sigma < 0 \text{ (free coordinate)} \end{cases}$$

Where ε represents the deviation from the equilibrium position.

According to another variant embodiment, a displacement function proportional to an intermediate function defined as follows is used:

$$f(\varepsilon, \sigma) = \begin{vmatrix} \beta, \text{ where } \beta \in [0, 1[, \text{ if } \sigma > 0 \text{(anchored coordinate)} \\ 1, \text{ if } \sigma = 0 \text{(fixed anchored coordinate)} \\ 0, \text{ if } \sigma < 0 \text{(free coordinate)} \end{vmatrix}$$

A convergence coefficient used for the displacement function is, for example, a convergence parameter between 0 and 0.5.

The coordinates of the anchors $A_i$ are, for example, defined as follows:
equal to measurements known a priori with a positive or zero uncertainty (this is reflected in the corresponding coordinate of the vector $\vec{\sigma}_{Ai}$), the coordinates are anchoring coordinates,
in the absence of measurements, the corresponding coordinate will be unused, and the coordinates are free.

According to one variant embodiment, an initial position of the points $\{M_i(0)\}_{i=0 \ldots N-1}$, is defined as follows:
arbitrarily, deterministically,
randomly, by randomly drawing values of the coordinates of the nodes,
by using the estimated positions resulting from a previous application of the method,
by using the suboptimal resolution method solution, such as pseudo-linearization (PSL),
by using anchoring data available for $A_i$, these coordinates are preferably used for the corresponding initial coordinates of $M_i$.

To implement the method, it is possible to designate an object as master, configured to execute the steps of the method according to the invention.

According to another variant embodiment, each object is configured to execute the steps of the method according to the invention.

The object whose position is sought is, for example, a node in a communication network.

The invention also relates to a device for determining the position of one or more objects able to move in a network, an object being provided with an inter-node distance measurement device and with a means for communication with the other nodes, the nodes communicating with one another via a radiofrequency link, characterized in that it comprises at least one processor configured to execute the steps of the method according to the invention and a device for measuring the position of the nodes.

BRIEF DESCRIPTION OF THE DRAWINGS

Other features and advantages of the present invention will become more clearly apparent on reading the following description of exemplary embodiments alongside the figures, in which.

DETAILED DESCRIPTION

Figure 2:
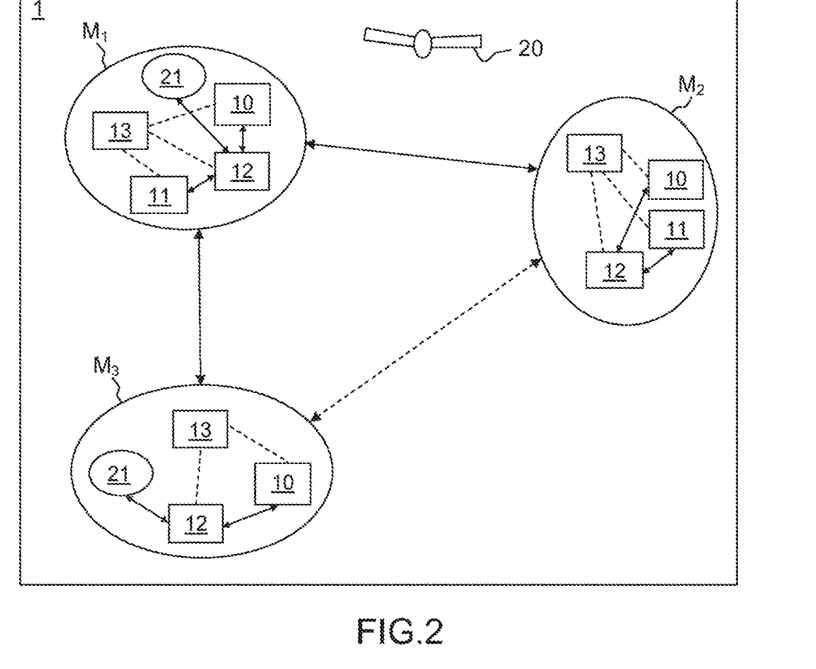
FIG. 2 shows a diagram of a communication network.

To better understand the method according to the invention, the following example is given in the case of a communication system 1 comprising a plurality of nodes Mi. Each node Mi ($M_1$, $M_2$, $M_3$) comprises, for example, a communication means 10, a processor 12 configured to execute the steps of the method according to the invention and a battery 13 or power supply device. The nodes Mi communicate with one another, for example, via a radiofrequency or wireless link or via other means known to those skilled in the art.

The system also comprises a device for determining the absolute position of all or some of the nodes. Thus, all or some of the nodes may for example be equipped with a receiver 11 which, coupled with a satellite device 20, allows the node equipped with the receiver 11 to geolocate itself. This device may be a global positioning system (GPS), a global navigation satellite system (GNSS), a topography means, etc. In FIG. 2, the node $M_2$ is equipped with a receiver, whereas the node $M_3$ is not.

It also comprises a distance measurement device or ranging device 21 collocated for example on a node Mi or on each of the nodes Mi of the system. For example, the device may take the form of an electronic board carried by the node. According to another variant embodiment, this could be a functionality of the communication system on a node measuring the time taken by a radio wave to transit between the nodes.

In this network, to implement the method, some of these nodes will have a known position and be assimilated to anchors.

In the method according to the invention, the principle consists notably in assimilating all of the nodes of the network to an elastically deformable body, the nodes being connected to one another by virtual springs whose distance to the equilibrium position is defined:
By the difference between their Euclidean inter-distance, and
By a ranging measurement obtained by virtue of an external device.

The method will explicitly calculate the displacements of the compatible nodes from the uncertainties as to the inter-node distance (the ranging measurements) and those as to the absolute position of nodes that are assumed to be known or anchors.

Figure 5:
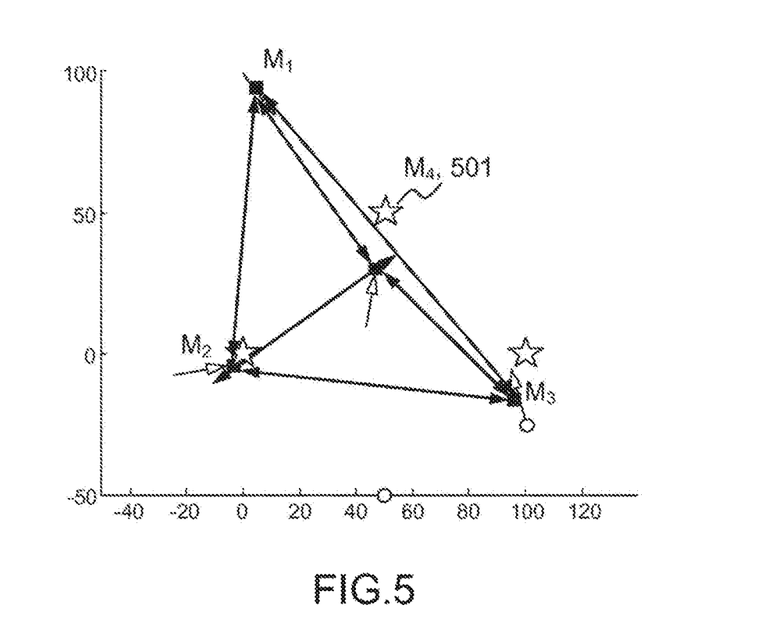
Figure 6:
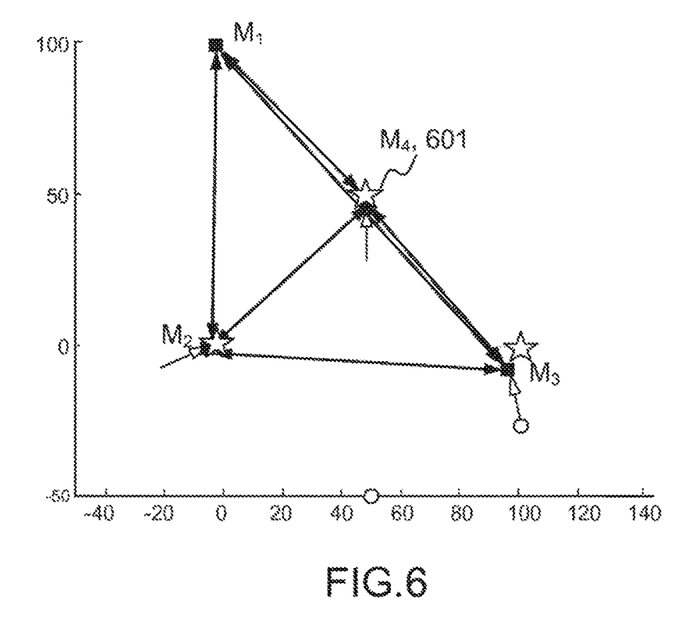
Figure 7:
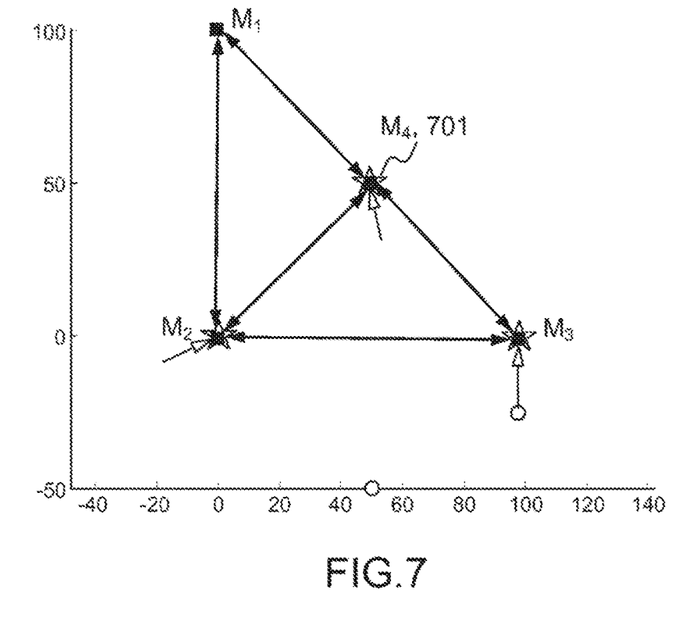

FIGS. 5 to 7, described further on in the description, illustrate the iterative displacement of the nodes of a candidate solution (estimated position of the nodes) toward a position that minimizes a global error criterion by notably bringing into play:
The calculation of vectors connecting pairs of nodes of the solution associated with each ranging measurement,
The evaluation of a measurement of the error between the distance between nodes of the solution and that measured by the ranging device, for example, the difference between the norm of these vectors and the associated ranging measurement,
Storage only of the position of the nodes resulting from the steps of the method according to the invention, the coordinates of the measured anchors and their associated uncertainties.

That is to say a set of N nodes $M_i$ having positions:

$$\vec{OM_i} = \begin{vmatrix} x_i \\ y_i \\ z_i \end{vmatrix} \text{ in three dimensions (3D) and } \vec{OM_i} = \begin{vmatrix} x_i \\ y_i \end{vmatrix}$$

in two dimensions (2D), the coordinates are, for example, chosen in a Cartesian reference frame, O being the origin point chosen in this reference frame.

The distance between two nodes $M_i$, $M_j$, $d(M_i,M_j)$, is defined by $d(M_i,M_j)=\|\overrightarrow{M_iM_j}\|$. All of the positions of the N nodes at a given time t, $P_t(t)=\{M_i(t)\}_{i=0 \ldots N-1}$ is called "current geometry".

$r_{ij}$ is a distance measurement (ranging) obtained between the node $M_i$ and the node $M_j$ by a dedicated measurement device (ranging module situated for example on the node) and known with an uncertainty $\sigma_{rij}$, corresponding to a standard deviation on the measurement.

The name "anchor" or "anchoring measurement" $A_i^k$ will be given to absolute position information on the $k^{th}$ coordinate of the node $M_i$, obtained with an uncertainty $\sigma_{Ai}^k$. This information may be obtained using various means, such as topographical surveys or GNSS receivers. The information on the position of an anchor varies according to the measurement time. It is a function delivered for example in real time by a GPS device. For simplicity of writing, time is not indicated in the disclosure of the invention; a person skilled in the art will have no difficulty in integrating it.

All of the coordinates of an anchor may be known a priori or only in part, for example when the position of the node is determined by examining a map: if the node is situated on a road, it is possible to know that the node is at a given latitude without knowing the longitude thereof.

The method according to the invention is based, notably, on a direct calculation of the displacement elements of the position of the nodes at each iteration of the method, taking into account the relative uncertainty between ranging measurements $\sigma_{rij}$ and the uncertainty $\sigma_{Ai}^k$ as to the position of possible anchors.

According to one variant embodiment, and in order not to particularize the role of the nodes associated with an effective anchor and to allow the generalization of the method to partial anchoring, i.e., at least one coordinate of the node is constrained by an external measurement, a virtual anchor $A_i$ and an uncertainty vector $\overrightarrow{\sigma}_{Ai}$ are associated with each node $M_i$.

The virtual anchor and the uncertainty vector are defined as follows by their coordinates of index k:

If an external measurement $m_i^k$ is assumed to be known (direct measurement of coordinates by a geolocation device such as, for example, a GNSS sensor or a topographical survey) on the coordinate k of the node $M_i$ with the uncertainty $\sigma_{Ai}^k$ (for example, the standard deviation of measurement on $m_i^k$), then the $k^{th}$ coordinate of the anchor $A_i$ is equal to $m_i^k$ and the $k^{th}$ coordinate of the uncertainty vector $\overrightarrow{\sigma}_{Ai}$ is equal to $\overrightarrow{\sigma}_{Ai}^k$. This $k^{th}$ coordinate of the node will be said to be "anchored";

In the opposite case, the $k^{th}$ coordinate of the anchor $A_i$ is set to an arbitrary value (for example, 0) and the $k^{th}$ coordinate of the uncertainty vector $\sigma_{Ai}$ is set to a negative arbitrary value (for example, −1). This coordinate of the node will be said to be "free".

At each iteration of the method, there is calculated, for each node $M_i$:

The vector sum of the ranging displacements $\overrightarrow{\sigma}_{\rightarrow i}$ applicable to the node $M_i$ due solely to the deviations from the ranging measurements relative to the node $M_i$. This displacement is calculated as the sum over all of the ranging measurements $R_i$ of the displacements $\overrightarrow{\delta}_{j \rightarrow i}$ due to the relative ranging measurement $r_{ij}$ between $M_i$ and $M_j$ and its uncertainty $\sigma_{rij}$;

The vector that links the two points Mi and Mj is defined as follows:

$$\vec{\delta}_{\rightarrow i} = \sum_{j \in R_i} \vec{\delta}_{j \rightarrow i} \text{ where } \vec{\delta}_{j \rightarrow i} = \varphi(\Delta_{ij}, \sigma_{rij}) \frac{\overrightarrow{M_jM_i}}{\|\overrightarrow{M_jM_i}\|}$$

with $\Delta_{ij}$ the coordinates of $M_jM_i$, $\varphi$ is a given displacement function and $R_i=\{r_{ij}\}$ represents all of the available ranging measurements toward $M_i$.

If all or some of the coordinates of $M_i$ are "anchored", a return displacement to this anchor $\overrightarrow{a}_{\rightarrow i}$ or anchoring correction is calculated. To limit the occurrence of potential oscillation phenomena, the calculation of this anchoring correction is performed on the position of $M_i$, translated from the associated ranging correction.

The anchoring correction is $\overrightarrow{a}_{\rightarrow i}=\Psi(\overrightarrow{A_iM_i}+\overrightarrow{\delta}_{\rightarrow i}, \overrightarrow{\sigma}_{Ai})$, where $\Psi$ is a displacement function.

The choice of the displacement functions $\varphi$ and $\Psi$ is free provided that it leads to a displacement toward a point of equilibrium $(r_{ij}=\|\overrightarrow{M_jM_i}\|)$ for $\varphi$ and $(\overrightarrow{A_iM_i}=\vec{0})$ for $\Psi$.

These functions are, for example, selected so as to reflect a certain degree of knowledge about the probability distributions associated with the measurements. Exemplary displacement functions are given hereinafter.

For Gaussian distributions, the displacements are proportional to an intermediate function:

$$f(\varepsilon, \sigma) = \begin{cases} 1 - e^{-\frac{\varepsilon^2}{2\sigma^2}}, & \text{if } \sigma > 0 \text{ (anchored coordinate)} \\ 1, & \text{if } \sigma = 0 \text{ (fixed anchored coordinate)} \\ 0, & \text{if } \sigma < 0 \text{ (free coordinate)} \end{cases}$$

Where $\varepsilon$ represents the deviation from the equilibrium position;

If this deviation $\varepsilon$ is small with respect to $\sigma$, the probability that the measurement is close to equilibrium is high: this function will be close to 0 and the corrective displacement will be small, If this deviation $\varepsilon$ is large with respect to $\sigma$, the probability that the measurement is close to equilibrium is low: this function will be close to 1 and the corrective displacement will be large.

Without particular information on the law of probability of the errors, the intermediate function is defined as follows:

$$f(\varepsilon, \sigma) = \begin{cases} \beta, \text{ where } \beta \in [0, 1[, & \text{if } \sigma > 0 \text{ (anchored coordinate)} \\ 1, & \text{if } \sigma = 0 \text{ (fixed anchored coordinate)} \\ 0, & \text{if } \sigma < 0 \text{ (free coordinate)} \end{cases}$$

The displacement will correspond to a constant fraction of the deviation from equilibrium.

A few particular cases are given by way of illustration:

If $\sigma=0$, the coordinate is perfectly known (known measurement with infinite precision, in practice much lower than the desired positioning precision, as in the case of a topographical survey): the displacement will be such that it returns the coordinate exactly to the measured value;

If σ<0, the coordinate is free (notation device indicating that the coordinate is not anchored). No return displacement is applied (in practice, no calculation is necessary for these coordinates).

By defining this intermediate function, the functions φ and Ψ may be written:

$$\sigma(\Delta,\sigma)=\mu\Delta f(\Delta,\sigma).$$

The parameter μ is a convergence parameter strictly between 0 and 0.5. The lower this parameter, the more the method will be able to converge in the presence of a large number of nodes and initial positions remote from the optimal solution, but the lower the speed of convergence. According to one variant embodiment, the convergence parameter is taken to be μ=1/N.

$$\Psi(\vec{\Delta},\vec{\sigma}) = \begin{vmatrix} -\Delta_1 f(\Delta_1, \sigma_1) \\ -\Delta_2 f(\Delta_2, \sigma_2) \\ -\Delta_3 f(\Delta_3, \sigma_3)(cas\ 3D) \end{vmatrix},$$

displacement function,

With $\Delta_1$ the first coordinate of the point Mi and $\sigma_1$ the corresponding uncertainty.

In the absence of anchoring measurements, $\Psi(\vec{\Delta},\vec{\sigma})=0$, the method then converges toward a dereferenced solution, that is to say a geometry of nodes in which the relative positions of the nodes of the solution are compatible with the available ranging measurements (i.e. the actual geometry may be deduced therefrom via operations of translation, rotation and overall symmetry).

The search for a solution, i.e. for the actual position of the nodes, for a given ranging set between N nodes, is iterative. It assumes notably:

Creating a set of N points, called virtual anchors, $\{A_i\}_{i=0\ldots N-1}$ and N uncertainty vectors $\{\vec{\sigma}_{Ai}\}_{i=0\ldots N-1}$ associated with these anchors;

The coordinates of these anchoring points $A_i$ are:

equal to measurements known a priori with a positive or zero uncertainty (this is reflected in the corresponding coordinate of the vector $\vec{\sigma}_{Ai}$). Reference will be made to anchoring coordinates, in the absence of measurements, the corresponding coordinate will be unused (arbitrary value, for example, 0). This lack of information is stored (for example, by setting the negative value at −1 in the corresponding coordinate of the vector $\vec{\sigma}_i$). Reference will then be made to free coordinates;

Creating a set of N points $\{M_i\}_{i=0\ldots N-1}$ that will contain the positions of the nodes of the network estimated by the method;

Defining an "initial" position of the points $\{M_i(0)\}_{i=0\ldots N-1}$, which may be set:

arbitrarily, deterministically, randomly, by randomly drawing values of the coordinates of the nodes, by using the estimated positions resulting from a previous application of the method, by using the suboptimal resolution method solution, such as pseudo-linearization (PSL), by using anchoring data available for $A_i$, these coordinates are preferably used for the corresponding initial coordinates of $M_i$, Having a set E of Q ranging measurements between two nodes i and j: $E=\{r_{ij}\}_{q\in[0,Q-1]}$ with $(i,j)\in[0,N-1]^2$ and associated uncertainties $\{\sigma_{rij}\}_{q\in[0,Q-1]}$;

Defining displacement functions φ and Ψ.

The formalism of the virtual anchors is not essential to the implementation of the method according to the invention, but simplifies the description thereof. Specifically, it is possible to calculate the anchoring corrections by describing a calculation loop on the anchoring coordinates alone and their uncertainties, which equally reduces the calculations and needless storage for the free coordinates.

Figure 3:
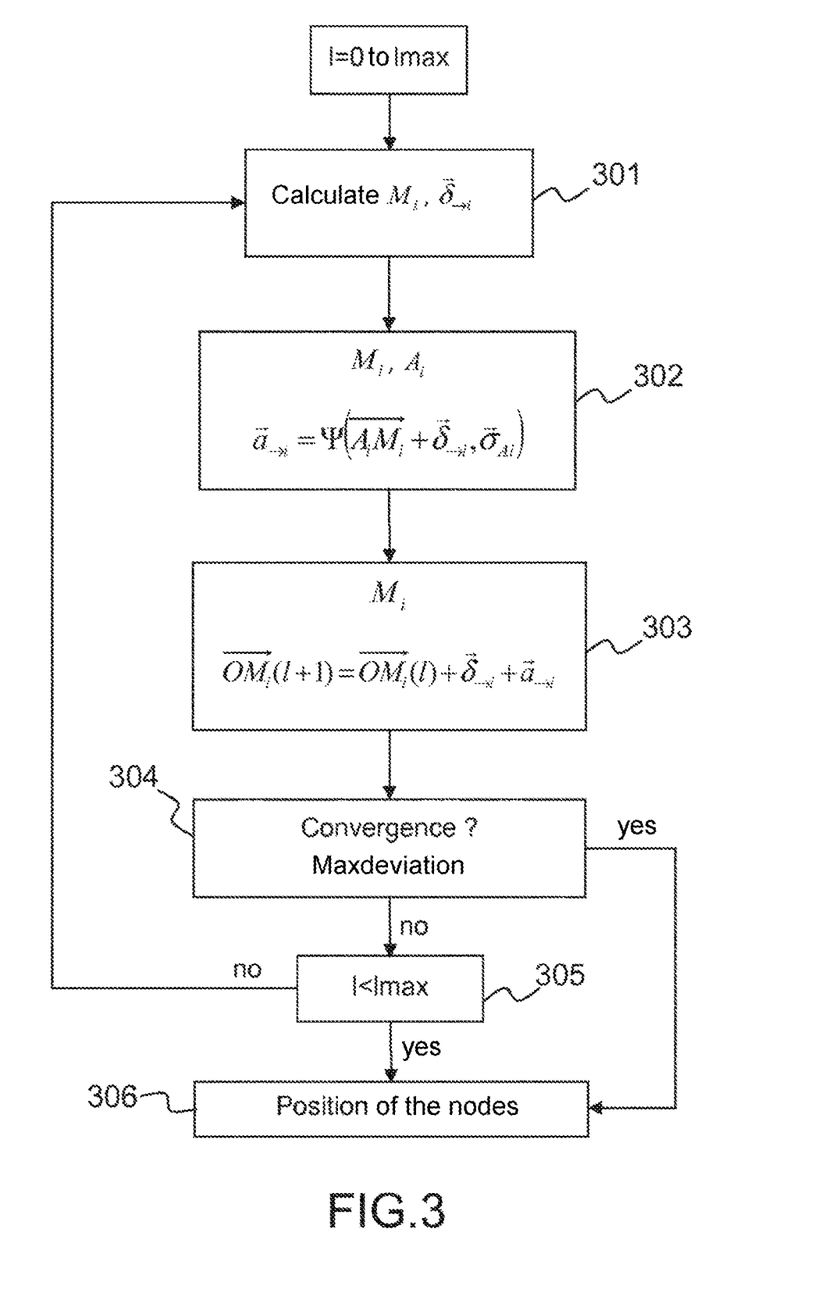
FIG. 3 shows a flow chart with the main steps of the method according to the invention.

The method comprises for example the following steps, which are reiterated and illustrated in FIG. 3:

For l=0 to $l_{max}$, with the value of $l_{max}$ chosen so as to limit the time spent in the absence of convergence of the steps;

Step 1, 301, for each node $M_i$, calculate the ranging displacement $$\vec{\delta}_{\to i} = \sum_{j\in R_i} \vec{\delta}_{j\to i}\ \text{where}\ \vec{\delta}_{j\to i} = \varphi(\Delta_{ij},\sigma_{rij})\frac{\overrightarrow{M_jM_i}}{\|\overrightarrow{M_jM_i}\|}$$

induced on this node $M_i$ by all of the other nodes having a ranging measurement from the node $M_i$, Step 2, 302, for each node $M_i$, having an anchoring coordinate in the associated virtual anchor $A_i$, calculate an anchoring correction $\vec{a}_{\to i}$, i.e. return displacement toward this anchor, using the formula $\vec{a}_{\to i}=\Psi(\overrightarrow{A_iM_i}+\vec{\delta}_{\to i},\vec{\sigma}_{Ai})$, i.e. return displacement dependent on the vector $\overrightarrow{A_iM_i}$ and on a ranging displacement $\vec{\delta}_{\to i}$, Step 3, 303, apply, to each node $M_i$, a displacement equal to the sum of the ranging displacement $\vec{\delta}_{\to i}$ and the anchoring correction $\vec{a}_{\to i}$ that were calculated previously. $\overrightarrow{OM_i}(l+1)=\overrightarrow{OM_i}(l)+\vec{\delta}_{\to i}+\vec{a}_{\to i}$, Step 4, 304, calculate $$\Delta_{tot}^2 = \sum_{i=0}^{N-1} \Delta_i^2\ \text{where}\ \Delta_i^2 = \sum_{j\neq i} \Delta_{ij}^2$$

with $\Delta_{ij}=r_{ij}-d(M_i,M_j)$ where Δ is interpreted as an error term between distance estimation $r_{ij}$ and distance measurement provided by the ranging devices, compare this quantity with a stopping criterion defined beforehand by an operator, for example, if $\Delta_{tot}^2\leq\Delta_{fin}^2$, or else $\max(|\Delta_{ij}|)<$Maxdeviation, if this test is met, stop the steps and go to step 6, Step 5, 305, if not, if the stopping criterion is not satisfied, it will be tested whether a maximum number of iterations has been reached, If l<$l_{max}$ then l=l+1 is iterated and step 1 is returned to, if not go to step 6, Step 6, 306, end of the iterations. At this stage, the positions of the nodes $M_i$ correspond to the best estimation of the actual position obtained by implementing the steps.

It is noted that, if l=$l_{max}$, the method has not converged toward a solution that complies with the desired imposed error constraints: this indicates to the user that the estimated position of the nodes may not be satisfactory. In this case, the quantities $\Delta_{tot}^2$ and $\max(|A_{ij}|)$ provide a measurement of this deviation from the precision objectives $\Delta_{fin}^2$ (total squared error) and Maxdeviation (maximum elementary error on a pair of nodes).

FIGS. 4 to 7 outline the result of the steps of the method according to the invention, respectively, for the first iteration, the tenth iteration, the thirtieth iteration and the final positions in which the uncertainty as to the position of the point $M_3$ having coordinates (0, 100) is clearly greater than those of the other points $M_1$, $M_2$ and $M_4$.

In these figures, four nodes are shown, $M_1$, $M_2$, $M_3$ and $M_4$ in a Cartesian reference frame graduated in meters. Points $M_1$ and $M_2$ are anchored with high precision (for example via a topographical survey to within 10 cm), point $M_3$ is anchored but its initial position is incorrectly measured with a 20 m error (for example, by virtue of a GNSS means having an uncertainty of 15 m in standard deviation), and point $M_4$ is not anchored (no local absolute position measurement means). All of the nodes are equipped with a local ranging device for measuring the distance to the other nodes, with an uncertainty of 50 cm in standard deviation. These values are only illustrative of the method.

The actual positions of the nodes are embodied as stars, the positions of the initial solution are represented by circles and the positions of the nodes estimated by the method according to the invention are represented using squares for the current iteration. The dashed arrows have a length equal to the inter-node ranging measurements, and the arrows in unbroken lines correspond to the displacements applied during the steps of the method.

Figure 4:
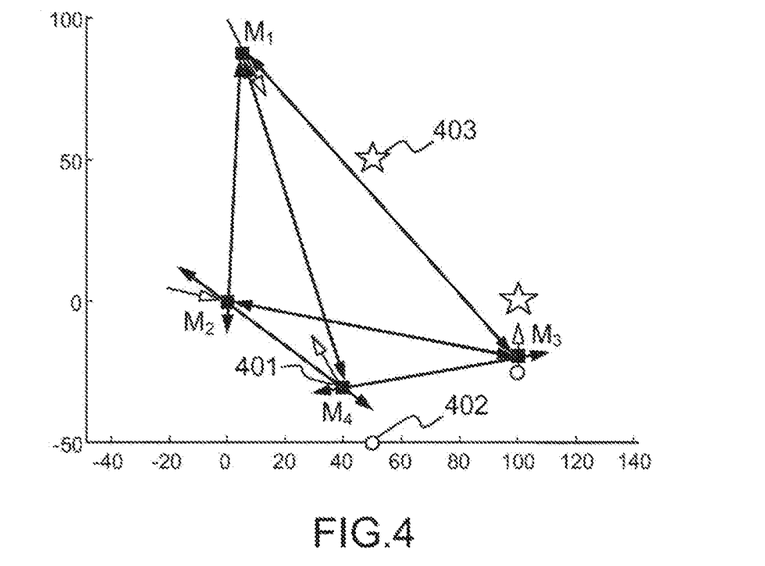
FIGS. 4, 5, 6 and 7 show an illustration of the steps of the method according to the invention.

FIG. 4 shows point Mi of estimated position P1, point $M_2$ of estimated position P2, point $M_3$ of estimated position P3 and a position relative to the initial position, point $M_4$ having an estimated position 401, a position 402 corresponding to the initial solution and an actual position 403.

FIG. 5 shows that, after the tenth iteration, the estimated position for point $M_4$ has moved to 501, then to point 601 after the thirtieth iteration in FIG. 6, and to point 701 in FIG. 7, the end of the steps. This illustration shows that point $M_4$, for which no coordinate is anchored, has been moved from iteration to iteration from a distant initialization position having coordinates (50, -50) to the desired position having coordinates (50, 50). At the same time, point $M_3$, although it is anchored but with significant uncertainty, is returned to its actual position by implementing the method. Points $M_1$ and $M_2$ virtually do not move because of the high precision of their anchoring.

The method according to the invention makes it possible to calculate a solution for a set of ranging measurements and possibly of given anchor positions. It may be applied again:

Upon receipt of new ranging measurements (either at each new measurement, or after receiving a batch of measurements to reduce demands in terms of computing resources);

Upon receipt of a new set of anchoring constraints (for example, information on the coordinates of certain nodes, for example originating from GNSS receivers, or topographical surveys);

Depending on the intended application, a new application of the method may use, as an initial solution, the previously calculated solution, in particular if the kinematics of the nodes involves limited displacements with respect to the refresh rate of the ranging measurements. The reuse of a previously calculated solution as initialization of a new application of the method at a later time limits the risks of non-convergence and makes it possible to considerably reduce the number of iterations to converge toward the new estimation of the position of the nodes.

The steps of the method according to the invention are applicable for example in a decentralized system, in which all of the nodes in question comprise a processor configured to execute the steps, the nodes exchanging the information by virtue of a communication means.

The method is also applicable in a centralized system in which a node of the network is for example designated central node.

The method according to the invention affords computational simplicity both in terms of memory and in terms of computing power. The only calculations necessary for the method to operate are the determination of the vectors formed by the pairs of nodes of the network for which a ranging measurement is available. In addition, the introduction of constraints such as the setting of all or some anchor coordinates, associated with the uncertainty as to these coordinates, is expressed very simply by modifying, with respect to these uncertainties, the non-linear displacement calculation function toward an equilibrium position (this being able to be tabulated so as to limit demands in terms of computing resources).

The invention claimed is:

1. A method for determining a position of one or more objects able to move in a network, each object being equipped with a communication device, one or more objects being equipped with a ranging device to measure distance to other objects of the network, one or more objects being equipped with a processor, and one or more objects being equipped with a positioning device such as a receiver coupled with a satellite such that at least some coordinates of an object are known, wherein the method comprises at least the following steps:

defining a set of points Ai or anchors and uncertainties associated with their coordinates, the coordinates of the anchors and the uncertainty as to the coordinates describing information on a position of the objects and the uncertainty as to this information, generating a set containing estimated positions of the objects and defining an initial position of the points, measuring with a distance measurement device collocated on an object or on each of nodes Mi, a set of distances between at least two objects Mi, Mj, with associated uncertainties, and executing the following steps:

Step 1, for each object $M_i$, the processor calculates a displacement $$\vec{\delta}_{\to i} = \sum_{j \in R_i} \vec{\delta}_{j \to i}$$

corresponding to a vector sum of a ranging or measurement displacements over a set of available ranging measurements toward the object $M_i$ and induced on the object $M_i$ by all of the other objects having a ranging measurement from said object $M_i$, due to a relative ranging measurement $r_{ij}$ between $M_i$ and $M_j$ and its uncertainty $\sigma_{rij}$, with $R_i = \{r_{ij}\}$ all of available ranging measurements toward $M_i$, and $$\vec{\delta}_{\to i} = \sum_{j \in R_i} \vec{\delta}_{j \to i} \text{ where } \vec{\delta}_{j \to i} = \varphi(\Delta_{ij}, \sigma_{rij}) \frac{\overrightarrow{M_j M_i}}{\|\overrightarrow{M_j M_i}\|}$$

with $\Delta_{ij}$ the coordinates of $M_jM_i$, $\varphi$ is a given displacement function, Step 2, for each object $M_i$, having an anchoring coordinate in a virtual anchor associated with a fixed anchor $A_i$, calculate a return displacement value $\vec{a}_{\rightarrow i}$ to this anchor, with $\vec{a}_{\rightarrow i}=\Psi(\overrightarrow{A_iM_i}+\vec{\delta}_{\rightarrow i}, \vec{\sigma}_{Ai})$, $\Psi$ a displacement function, Step 3, apply, to each object $M_i$ a displacement equal to a sum of the ranging displacement $\vec{\delta}_{\rightarrow i}$ and the anchoring correction $\vec{a}_{\rightarrow i}$ that were calculated previously, Step 4, calculate a square of an error term $\Delta_{tot}^2$, where $$\Delta_i^2 = \sum_{j \neq i} \Delta_{ij}^2$$

with $\Delta_{ij}=r_{ij}-d(M_i,M_j)$, $\Delta$ being an error term between an estimation of distance $d(M_i, M_j)$ after displacement of the object in step 3 and the distance measurement provided by ranging devices on all of the nodes, compare this quantity with a stopping criterion defined beforehand by an operator if $\Delta_{tot}^2 \leq \Delta_{fin}^2$, or else $\max(|\Delta_{ij}|)<$Maxdeviation, if this test is met, go to step 6, if not, Step 5, test whether a maximum number of iterations has been reached, if $l<l_{max}$ then iterate $l=l+1$ and go to step 1, if not go to step 6, and Step 6, end of the iterations, define a position of the objects corresponding to the best estimation of an actual position of the objects obtained for each object.

2. The method as claimed in claim 1, wherein an anchor and its uncertainty vector are defined as follows:

if an external measurement $m_i^k$ is assumed to be known on the coordinate k of the object $M_i$ with an uncertainty $\sigma_{Ai}^k$, then the $k^{th}$ coordinate of the anchor $A_i$ is equal to $m_i^k$ and the $k^{th}$ coordinate of the uncertainty vector $\vec{\sigma}_{Ai}$ is equal to $\sigma_{Ai}^k$ in the opposite case, the $k^{th}$ coordinate of the anchor $A_i$ is set to an arbitrary value and the $k^{th}$ coordinate of the uncertainty vector $\sigma_{Ai}$ is set to a negative arbitrary value.

3. The method as claimed in claim 1, wherein a displacement function proportional to an intermediate function defined as follows is used:

$$f(\varepsilon, \sigma) = \begin{vmatrix} 1 - e^{-\frac{\varepsilon^2}{2\sigma^2}}, \text{ if } \sigma > 0 \text{(anchored coordinate)} \\ 1, \text{ if } \sigma = 0 \text{(fixed anchored coordinate)} \\ 0, \text{ if } \sigma < 0 \text{(free coordinate)} \end{vmatrix}$$

where $\varepsilon$ represents a deviation from an equilibrium position.

4. The method as claimed in claim 1, wherein a displacement function proportional to an intermediate function defined as follows is used:

$$f(\varepsilon, \sigma) = \begin{vmatrix} \beta, \text{ where } \beta \in [0, 1[, \text{ if } \sigma > 0 \text{(anchored coordinate)} \\ 1, \text{ if } \sigma = 0 \text{(fixed anchored coordinate)} \\ 0, \text{ if } \sigma < 0 \text{(free coordinate)}. \end{vmatrix}$$

5. The method as claimed in claim 3, wherein there is taken into account, in a displacement function, a convergence parameter between 0 and 0.5 as a coefficient.

6. The method as claimed in claim 1, wherein the coordinates of the anchors $A_i$ are defined as follows:

equal to measurements known a priori with a positive or zero uncertainty (this is reflected in the corresponding coordinate of the vector $\vec{\sigma}_{Ai}$), the coordinates are anchoring coordinates, in the absence of measurements, the corresponding coordinate will be unused, and the coordinates are free.

7. The method as claimed in claim 1, wherein an initial position of the points $\{M_i(0)\}_{i=0 \ldots N-1}$ is defined as follows:

arbitrarily, deterministically, randomly, by randomly drawing values of the coordinates of the nodes, by using the estimated positions resulting from a previous application of the method, by using a suboptimal resolution method solution, such as pseudo-linearization (PSL), by using anchoring data available for $A_i$, these coordinates are preferably used for corresponding initial coordinates of $M_i$.

8. The method as claimed in claim 1, wherein an object is designated as master and in that said object is configured to execute the steps of the method as claimed in claim 1, and to centralize the results.

9. The method as claimed in claim 1, wherein each object of the network is configured to execute the steps of the method as claimed in claim 1, and to centralize the results.

10. The method as claimed in claim 1, wherein the object whose position is sought is a node in a communication network.

11. A device for determining a position of one or more objects able to move in a network, the one or more objects being provided with an inter-node distance measurement device, nodes communicating with one another by virtue of a communication means, wherein the device comprises:

at least one processor configured to execute the steps of the method as claimed in claim 1, and a device for measuring a position of the nodes.

* * * * *